(12) United States Patent
Mitra et al.

(10) Patent No.: US 10,194,517 B2
(45) Date of Patent: Jan. 29, 2019

(54) PLASMA ARC CUTTING SYSTEM, CONSUMABLES AND OPERATIONAL METHODS

(71) Applicant: Hypertherm, Inc., Hanover, NH (US)

(72) Inventors: Madhura S. Mitra, Lebanon, NH (US); Stephen M. Liebold, Grantham, NH (US); Harshawardhan Jogdand, Lebanon, NH (US); Adam Chevalier, Orford, NH (US); John Peters, Canaan, NH (US); Soumya Mitra, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/471,351

(22) Filed: Mar. 28, 2017

(65) Prior Publication Data

US 2017/0280547 A1  Sep. 28, 2017

Related U.S. Application Data

(60) Provisional application No. 62/347,856, filed on Jun. 9, 2016, provisional application No. 62/320,935, filed
(Continued)

(51) Int. Cl.
*B23K 10/00* (2006.01)
*H05H 1/34* (2006.01)
*H05H 1/28* (2006.01)

(52) U.S. Cl.
CPC .............. *H05H 1/34* (2013.01); *B23K 10/00* (2013.01); *H05H 1/28* (2013.01);
(Continued)

(58) Field of Classification Search
CPC ... H05H 1/34; H05H 1/28; H05H 1/27; B23K 10/00; H05B 2001/3436; H05B 2001/3468; H05B 2001/3478
(Continued)

(56) References Cited

U.S. PATENT DOCUMENTS 3,641,308 A * 2/1972 Couch, Jr. ............ H05H 1/3405
219/121.49
5,317,126 A * 5/1994 Couch, Jr. ................ H05H 1/34
219/121.48

(Continued)

FOREIGN PATENT DOCUMENTS

| EP | 1893004 A1 | 2/2008 |
|---|---|---|
| RU | 2056985 C1 | 3/1996 |
| WO | 2015/015265 A1 | 2/2015 |

*Primary Examiner* — Mark Paschall
(74) *Attorney, Agent, or Firm* — Proskauer Rose LLP

(57) ABSTRACT

The invention features methods and apparatuses for liquid cooling a plasma arc torch. An electrode is provided including a body having a longitudinal axis defining a first end, a second end, and a middle portion. The electrode includes a first sealing element disposed on an exterior of the body near the first end; a second sealing element disposed on the exterior of the body located in the middle portion, the second sealing element configured to provide a first gas seal to a swirl gas chamber and defining a portion of the swirl gas chamber; and a third sealing element disposed on the exterior of the body, the third sealing element located between the second sealing element and the second end, the third sealing element configured to provide a second gas seal to the swirl gas chamber and defining a portion of the swirl gas chamber.

20 Claims, 3 Drawing Sheets

Related U.S. Application Data on Apr. 11, 2016, provisional application No. 62/314,097, filed on Mar. 28, 2016.

(52) U.S. Cl.
CPC ............ *H05H 2001/3436* (2013.01); *H05H 2001/3468* (2013.01); *H05H 2001/3478* (2013.01)

(58) Field of Classification Search
USPC ......... 219/121.49, 121.5, 121.51, 121.52, 75
See application file for complete search history.

(56) References Cited

U.S. PATENT DOCUMENTS

| | | | |
|---|---|---|---|
| 5,893,985 A | 4/1999 | Luo et al. | |
| 5,965,040 A | 10/1999 | Luo et al. | |
| 5,977,510 A | 11/1999 | Lindsay | |
| 7,598,473 B2* | 10/2009 | Cook | B23K 10/00 219/121.5 |
| 8,338,740 B2 | 12/2012 | Liebold et al. | |
| 2004/0200810 A1* | 10/2004 | Brandt | H05H 1/28 219/121.49 |
| 2006/0049150 A1* | 3/2006 | Severance, Jr. | H05H 1/34 219/121.52 |
| 2008/0173622 A1* | 7/2008 | Lindsay | H05H 1/34 219/121.52 |
| 2008/0210669 A1* | 9/2008 | Yang | B23K 10/00 219/121.49 |
| 2008/0217305 A1 | 9/2008 | Sanders | |
| 2010/0078408 A1* | 4/2010 | Liebold | H05H 1/28 219/121.5 |
| 2012/0031881 A1* | 2/2012 | Griffin | B23K 10/00 219/121.5 |
| 2012/0055906 A1 | 3/2012 | Shipulski et al. | |

\* cited by examiner

PLASMA ARC CUTTING SYSTEM, CONSUMABLES AND OPERATIONAL METHODS

RELATED APPLICATIONS

This application claims the benefit of U.S. Provisional Patent Application No. 62/347,856, which was filed on Jun. 9, 2016 and entitled "Metering Holes in the Shield Swirler." This application also claims the benefit of U.S. Provisional Patent Application No. 62/320,935, which was filed on Apr. 11, 2016 and entitled "Consumables for Plasma Arc Torch." This application also claims the benefit of U.S. Provisional Patent Application No. 62/314,097, which was filed on Mar. 28, 2016 and entitled "Metering Holes in the Shield Swirler." The entire contents of these applications are incorporated herein by reference.

FIELD OF THE INVENTION

The invention relates generally to the field of plasma arc cutting systems and processes. More specifically, the invention relates to improved consumable components (e.g., electrodes) and operational methods for cooling a plasma arc torch.

BACKGROUND

Plasma arc torches are widely used in the cutting and marking of materials. A plasma arc torch generally includes an electrode and a nozzle having a central exit orifice mounted within a torch body, electrical connections, passages for cooling, and passages for arc control fluids (e.g., plasma gas). The torch produces a plasma arc, i.e., a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of starting methods.

Current plasma arc torches utilize electrodes having either one or two sealing members (e.g., o-rings) for providing fluid seals within the torch during operation, e.g., to prevent liquids and/or gases from entering certain regions of the torch. One example of such a configuration is in U.S. Pat. No. 8,338,740. In most prior art torches, the first contact of the plasma gas with the electrode body is downstream of the swirl ring, so the plasma gas is already swirling when it makes this first contact. What would be beneficial would be an electrode that allows some of the complexity of gas flow to be moved closer to the electrode body, permitting a shorter electrode body to be used in modern complex torches.

SUMMARY OF THE INVENTION

The present invention relates to systems and methods for improved consumables (e.g., electrodes) for plasma arc torches and associated methods of directing fluid flow and cooling consumables in plasma arc torches. In one aspect, the invention features an electrode for a liquid cooled plasma arc torch. The electrode includes a body having a longitudinal axis defining a first end, a second end, and a middle portion between the first and second ends. The electrode includes a first sealing element disposed on an exterior of the body near the first end. The electrode includes a second sealing element disposed on the exterior of the body, the second sealing element located in the middle portion between the first sealing element and the second end along the longitudinal axis. The second sealing element is configured to provide a first gas seal to a swirl gas chamber. The second sealing element defines a portion of the swirl gas chamber. The electrode includes a third sealing element disposed on the exterior of the body. The third sealing element is located between the second sealing element and the second end along the longitudinal axis. The third sealing element is configured to provide a second gas seal to the swirl gas chamber. The third sealing element defines a portion of the swirl gas chamber. The present electrode allows some of the complexity of gas flow to be moved closer to the electrode. This allows for more gas flow complexity to be added to a torch without requiring longer torch electrodes. Also, in certain embodiments, the present torch can have an axial swirl and/or an axial flow. Locating the complexity in the interface between the electrode and the swirl ring allows for the improved swirl designs to be used in the torch.

In some embodiments, the first sealing element provides a liquid seal. In some embodiments, the first sealing element seals the exterior of the electrode body from a coolant directed to an interior surface of the electrode. In some embodiments, the second sealing element forms a first end of the swirl gas chamber, the first end configured to force a swirl gas through an opening of the swirl ring. In some embodiments, the third sealing element seals an end of the swirl gas chamber such that the swirl gas is forced through swirl holes in the swirl ring. In some embodiments, a diameter of the first sealing element is larger than a diameter of the second sealing element. In some embodiments, a diameter of the second sealing element is larger than a diameter of the third sealing element. In some embodiments, the electrode includes a quick-lock thread located near the first end of the body. In some embodiments, the electrode has a tapered shape configured to allow the electrode sealing elements to engage with and slide against adjacent components of the plasma arc torch such that a force required to assemble the electrode in the torch is reduced. In some embodiments, one or more of the sealing elements are o-rings. In some embodiments, the sealing elements are portions of chambers of the plasma arc torch.

In another aspect, the invention features an electrode for a liquid cooled plasma arc torch. The electrode includes a substantially hollow body having a first section, a second section, and a third section. The second section is disposed between the first section and the third section. The electrode includes a first sealing member disposed circumferentially around an exterior surface of the first section of the body. The electrode includes a second sealing member disposed circumferentially around an exterior surface of the second section of the body. The electrode includes a third sealing member disposed circumferentially around an exterior surface of the third section of the body. The second sealing member and the third sealing member define a portion of a swirl gas chamber when the electrode is installed in the liquid cooled plasma arc torch.

In some embodiments, the first sealing member provides a liquid seal. In some embodiments, the first sealing member seals the exterior surface of the first section of the body from a coolant directed to an interior surface of the electrode. In some embodiments, the second sealing member forms a first end of the swirl gas chamber, the first end configured to force a swirl gas through an opening of the swirl ring. In some embodiments, a diameter of the first sealing member is larger than a diameter of the second sealing member. In some embodiments, a diameter of the second sealing member is larger than a diameter of the third sealing member. In some embodiments, the electrode includes a quick-lock thread located on or near the first section of the body. In some embodiments, the electrode has a tapered shape configured to allow the electrode sealing members to engage with and slide against adjacent components of the plasma arc torch such that a force required to assemble the electrode in the torch is reduced. In some embodiments, one or more of the sealing members are o-rings.

In yet another aspect, the invention features a method of directing a plasma gas flow in a liquid cooled plasma arc torch. The method includes providing an electrode having a first liquid sealing member, a first gas sealing member, and a second gas sealing member. The method includes flowing a plasma gas about an exterior surface of the electrode into a channel. The method includes directing the plasma gas flow from the channel into a chamber, the chamber defined in part by the first gas sealing member and the second gas sealing member. The method includes directing the plasma gas flow through a set of swirl holes of the chamber and onto a workpiece.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
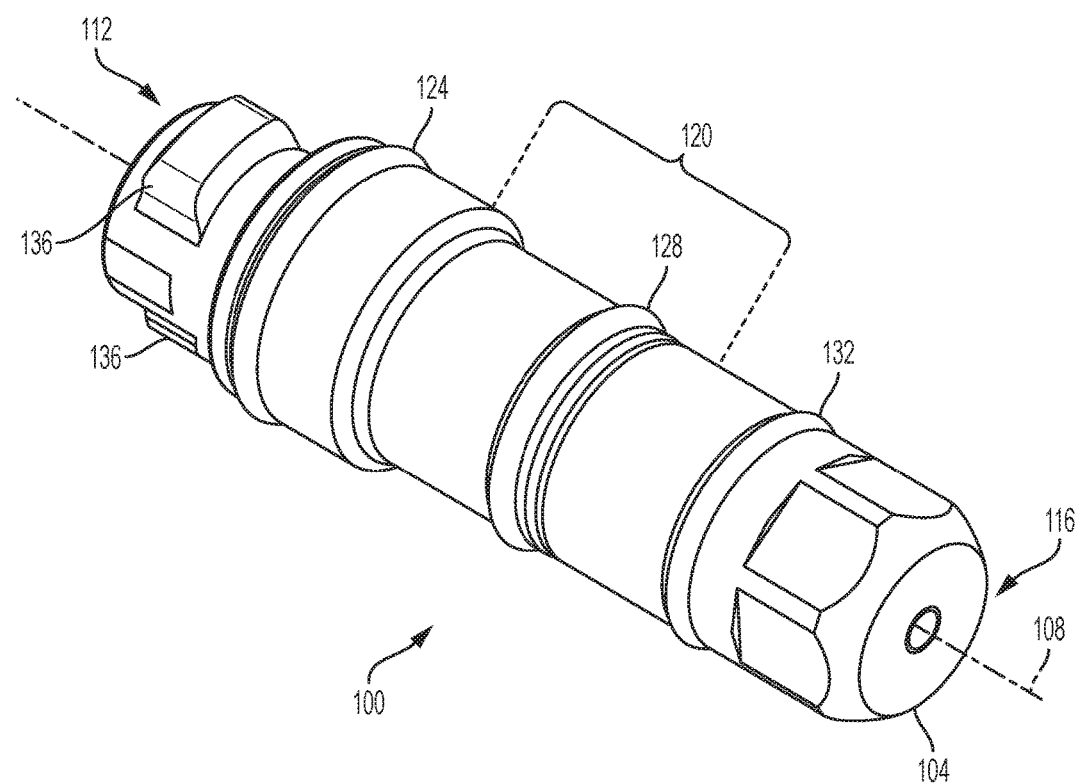
FIG. 1 is an isometric view of an electrode having three sealing elements, according to an illustrative embodiment of the invention.

FIG. 1 is an isometric view of an electrode 100 having three sealing elements 124, 128, 132, according to an illustrative embodiment of the invention. The electrode 100 includes a body 104 having a longitudinal axis 108 defining a first end 112, a second end 116, and a middle portion 120 between the first end 112 and the second end 116. The electrode 100 includes a first sealing element (or sealing member) 124, a second sealing element 128, and a third sealing element 132, each sealing element 124, 128, 132 positioned along the longitudinal axis 108 of the electrode 100. The first sealing element (or sealing member) 124 is disposed on the exterior of the electrode body 104 near the first end 112. The second sealing element 108 is disposed on the exterior of the electrode body 104 and is located in the middle portion 120 between the first sealing element 124 and the second end 116 along the longitudinal axis 108. When installed in a plasma arc torch, the second sealing element 128 is configured to define a portion of a swirl gas chamber (e.g., the swirl gas chamber 212 shown and described below in FIG. 2) and to provide a first gas seal to the swirl gas chamber. The third sealing element 132 is disposed on the exterior of the electrode body 104 and is located between the second sealing element 128 and the second end 116 along the longitudinal axis 108. The third sealing element 132 is configured to define a portion of the swirl gas chamber (e.g., the swirl gas chamber 212 shown and described below in FIG. 2) and to provide a second gas seal to the swirl gas chamber.

Each sealing element 124, 128, 132 defines a sealing surface and a different section of the electrode 100 over which a fluid flows when installed in the plasma arc torch (e.g., the plasma arc torch 200 shown and described below in FIG. 2). The first sealing element 124 seals the exterior of the electrode 104 from liquid coolants that are directed to the interior of the electrode 100 and around the threads 136. The second sealing element 128 forms a first end of the swirl gas chamber (e.g., the swirl gas chamber 212 shown and described below in FIG. 2). The third sealing element 132 seals the second end of the swirl gas chamber. Thus, the second sealing element 128 and the third sealing element 132 each define boundaries of the swirl gas chamber. In some embodiments, the sealing elements 124, 128, 132 are o-rings.

As can be seen in FIG. 1 (and correspondingly in FIG. 2 below), each sealing element 124, 128, 132 is placed on an exterior surface of the electrode body 104 that has a different diameter. In FIG. 1, the first sealing element 124 is on the surface having the largest of the three diameters. The second sealing element 128 is on a surface having an intermediate diameter, and the third sealing element 132 is on a surface having the smallest diameter. In some embodiments, this "tapered" configuration eases assembly of the electrode 100 with the swirl ring within the torch body. Moreover, the threads 136 (e.g., a "quick lock" thread feature) allow the electrode 100 to be fully axially assembled into the torch and rotated to engage the threads 136. In such a configuration, the mechanical advantage of the threads 136 cannot be used to force the sealing elements 124, 128, 132 into corresponding openings in the torch body. Therefore, the "tapered" configuration having different diameters of the electrode body 104 allows the electrode sealing elements 124, 128, 132 to engage with and slide against the adjacent components only for a short distance, reducing the force required to assemble the torch components.

Figure 2:
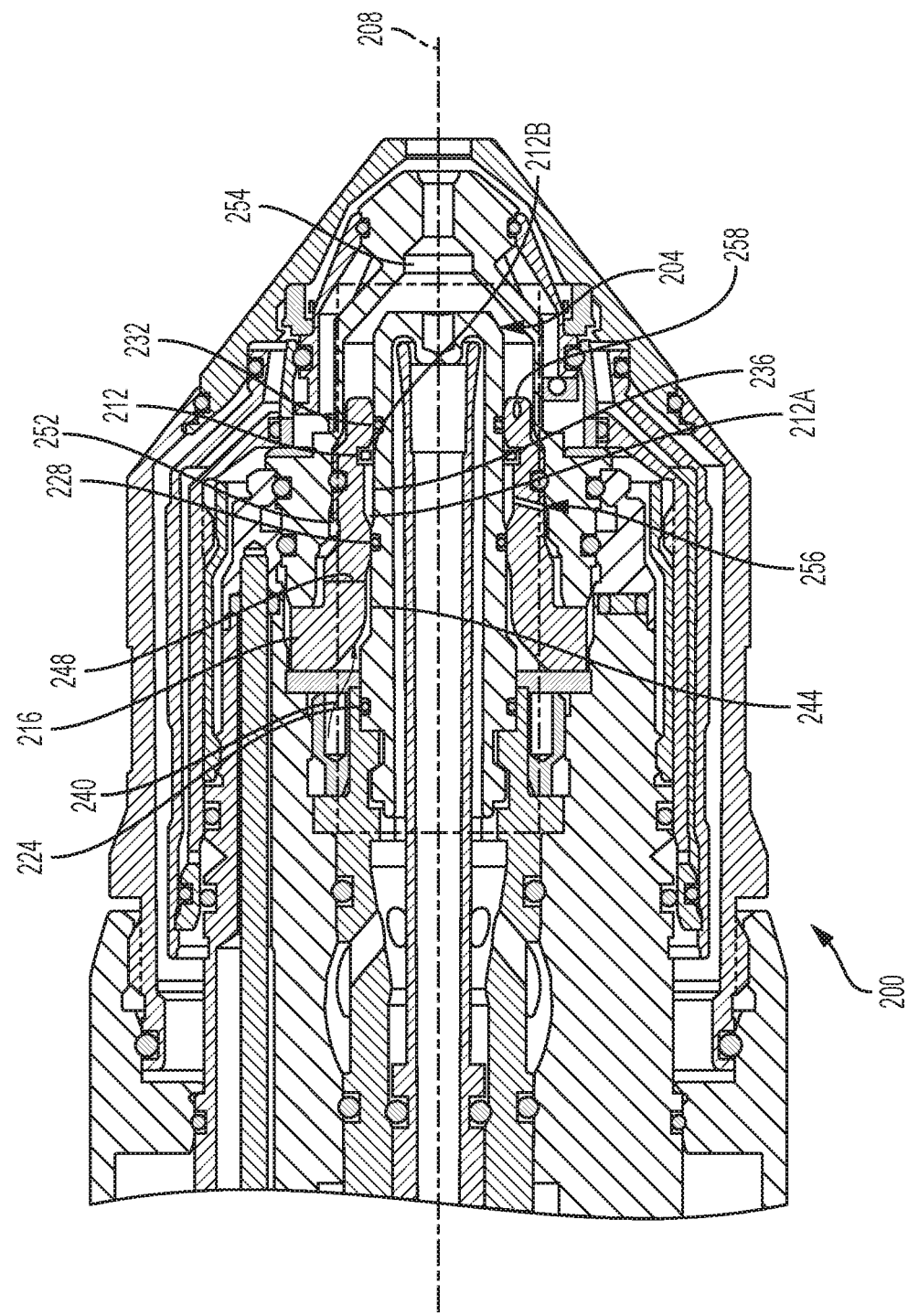
FIG. 2 is a cross-sectional view of a plasma arc torch having an electrode with three sealing members, where the electrode defines a portion of a swirl chamber, according to an illustrative embodiment of the invention.

FIG. 2 is a cross-sectional view of a plasma arc torch 200 having an electrode 204 with a longitudinal axis 208 and three sealing members 224, 228, 232, the electrode 204 defining a portion of a swirl chamber 212, according to an illustrative embodiment of the invention. When installed in the plasma arc torch 200, the electrode 204 engages with the swirl ring 216, and the sealing members 224, 228, 232 define various boundaries within the plasma arc torch 200. For example, the first sealing member 224 defines a water cooling boundary that seals the exterior surface of the electrode 204 a coolant directed to an interior surface of the electrode 204. The second sealing member 228 defines a first (or "metering" as explained below) boundary of the swirl gas chamber 212. The third sealing member 232 defines a second (or "swirling" as explained below) boundary of the swirl gas chamber 212. Thus, a portion of the swirl gas chamber 212 is defined by the second sealing member 228 and the third sealing member 232, together with the section of electrode wall 236 located between the second sealing member 228 and the third sealing member 232.

During operation of the plasma arc torch 200, swirl gas travels along a flow path 240 past the first sealing member 224 along an exterior surface 244 of the electrode 204. The swirl gas (or plasma gas) enters in the open rear chamber of the swirl ring 216. The rear chamber is defined as the gap between the interior of the swirl ring 216, the exterior surface 244 of the electrode, and the second sealing member 228. Once the swirl gas enters into the rear chamber it next directed through openings 248 as the second sealing member 228 prevents the gas from flow forward. Opening 248 extending from the interior of the swirl ring 216 to the exterior of the swirl ring and is oriented radially (e.g., orthogonally to the longitudinal axis 208) and flows into a torch passageway 252. The torch passageway is defined by the exterior of the electrode, and swirl gas continues along fluid flow path 240 toward a first end 212A of the swirl gas chamber 212 through metering holes (e.g. metering hole 256) in the swirl ring 216. The metering holes meter the swirl gas flow from the exterior of the swirl ring 216 into the swirl gas chamber 212. Swirl gas then flows onto a second end 212B of the swirl gas chamber 212 through an opening and to the outside of the swirl ring. The third sealing element 232 seals the second end 212B of the swirl gas chamber 212 such that swirl gas is forced through the swirl holes (not visible) in the front of the swirl ring and into the plasma plenum 254. Thus, the second sealing member 228 and the third sealing member 232 define a swirl gas chamber 212 that receives plasma gas from metering holes and discharges plasma gas through swirl holes. In some embodiments, it is beneficial to maintain separate swirl holes and metering holes because each set of holes performs a separate function requiring a different corresponding structure.

Figure 3:
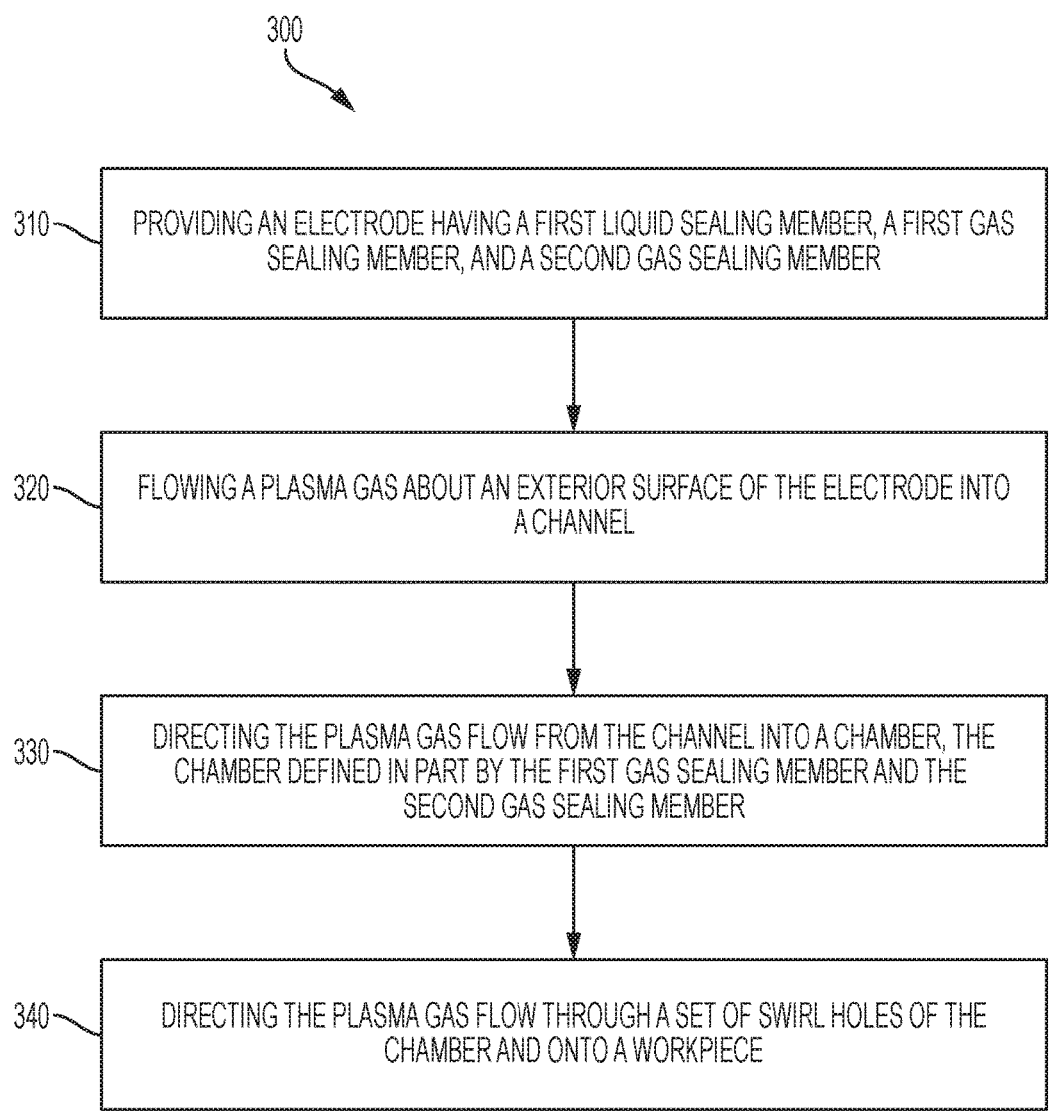
FIG. 3 is a schematic diagram of a method of directing a plasma gas flow in a liquid cooled plasma arc torch, according to an illustrative embodiment of the invention.

FIG. 3 is a schematic diagram of a method 300 of directing a plasma gas flow in a liquid cooled plasma arc torch, according to an illustrative embodiment of the invention. The method 300 includes a step 310 providing an electrode having a first liquid sealing member, a first gas sealing member, and a second gas sealing member. The method 300 includes a step 320 of flowing a plasma gas about an exterior surface of the electrode into a channel. The method 300 includes a step 330 of directing the plasma gas flow from the channel into a chamber, the chamber defined in part by the first gas sealing member and the second gas sealing member. The method 300 includes a step 340 of directing the plasma gas flow through a set of swirl holes of the chamber and onto a workpiece.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. An electrode for a liquid cooled plasma arc torch, the electrode comprising:
   a body having a longitudinal axis defining a first end, a second end, and a middle portion between the first and second ends;
   a first sealing element disposed on an exterior of the body near the first end of the body, the first sealing element configured to provide a liquid seal;
   a second sealing element disposed on the exterior of the body, the second sealing element located in the middle portion between the first sealing element and the second end of the body along the longitudinal axis, the second sealing element configured to provide a first gas seal to a swirl gas chamber and defining a portion of the swirl gas chamber; and
   a third sealing element disposed on the exterior of the body, the third sealing element located between the second sealing element and the second end of the body along the longitudinal axis, the third sealing element configured to provide a second gas seal to the swirl gas chamber and defining a portion of the swirl gas chamber.

2. The electrode of claim 1 wherein the first sealing element provides a liquid seal.

3. The electrode of claim 1 wherein the first sealing element seals the exterior of the electrode body from a coolant directed to an interior surface of the electrode.

4. The electrode of claim 1 wherein the second sealing element forms a first end of the swirl gas chamber, the first end of the swirl gas chamber configured to force a swirl gas through an opening of a swirl ring in contact with the electrode during operation of the plasma arc torch.

5. The electrode of claim 1 wherein the third sealing element seals an end of the swirl gas chamber such that a swirl gas is forced through swirl holes in a swirl ring in fluid communication with the swirl gas chamber.

6. The electrode of claim 1 wherein a diameter of the first sealing element is larger than a diameter of the second sealing element.

7. The electrode of claim 1 wherein a diameter of the second sealing element is larger than a diameter of the third sealing element.

8. The electrode of claim 1 further comprising a quick-lock thread located near the first end of the body.

9. The electrode of claim 1 wherein the electrode has a tapered shape between the first end of the body and the second end of the body, the tapered shape configured to allow the electrode sealing elements to engage with and slide against adjacent components of the plasma arc torch such that a force required to assemble the electrode in the torch is reduced.

10. The electrode of claim 1 wherein one or more of the sealing elements are o-rings.

11. The electrode of claim 1 wherein the sealing elements are portions of chambers of the plasma arc torch.

12. An electrode for a liquid cooled plasma arc torch, the electrode comprising:
   a substantially hollow body having a first section, a second section, and a third section, the second section disposed between the first section and the third section;
   a first sealing member disposed circumferentially around an exterior surface of the first section of the body, the first sealing element configured to provide a liquid seal;
   a second sealing member disposed circumferentially around an exterior surface of the second section of the body, the second sealing member configured to provide a first gas seal to a swirl gas chamber of the plasma arc torch; and
   a third sealing member disposed circumferentially around an exterior surface of the third section of the body, the third sealing member configured to provide a second gas seal to the swirl gas chamber of the plasma arc torch,
   wherein the second sealing member and the third sealing member define a portion of a swirl gas chamber when the electrode is installed in the liquid cooled plasma arc torch.

13. The electrode of claim 12 wherein the first sealing member provides a liquid seal.

14. The electrode of claim 12 wherein the first sealing member seals the exterior surface of the first section of the body from a coolant directed to an interior surface of the electrode.

15. The electrode of claim 12 wherein the second sealing member forms a first end of the swirl gas chamber, the first end of the swirl gas chamber configured to force a swirl gas through an opening of a swirl ring in contact with the electrode during operation of the plasma arc torch.

16. The electrode of claim 12 wherein a diameter of the first sealing member is larger than a diameter of the second sealing member and a diameter of the second sealing member is larger than a diameter of the third sealing member.

17. The electrode of claim 12 further comprising a quick-lock thread located on or near the first section of the body.

18. The electrode of claim 12 wherein the electrode has a tapered shape between the first end of the body and the second end of the body, the tapered shape configured to allow the electrode sealing members to engage with and slide against adjacent components of the plasma arc torch such that a force required to assemble the electrode in the torch is reduced.

19. The electrode of claim 12 wherein one or more of the sealing members are o-rings.

20. A method of directing a plasma gas flow in a liquid cooled plasma arc torch, the method comprising:
   providing an electrode having a first liquid sealing member disposed on an exterior of the electrode, a first gas sealing member disposed on the exterior of the electrode, and a second gas sealing member disposed on the exterior of the electrode;
   flowing a plasma gas about an exterior surface of the electrode into a channel;
   directing the plasma gas flow from the channel into a chamber, the chamber defined in part by the first gas sealing member and the second gas sealing member; and
   directing the plasma gas flow through a set of swirl holes of the chamber and onto a workpiece.

* * * * *